April 16, 1946.                C. T. McGILL ET AL                2,398,437
                                  MULTIPORT VALVE
                              Filed Aug. 24, 1942            6 Sheets-Sheet 1

Inventors:
Chester T. McGill
DeWayne Wessel
Morris W. Smith
By
McCanna, Wintercorn & Morsbach
Attys.

April 16, 1946.  C. T. McGILL ET AL  2,398,437
MULTIPORT VALVE
Filed Aug. 24, 1942  6 Sheets-Sheet 2
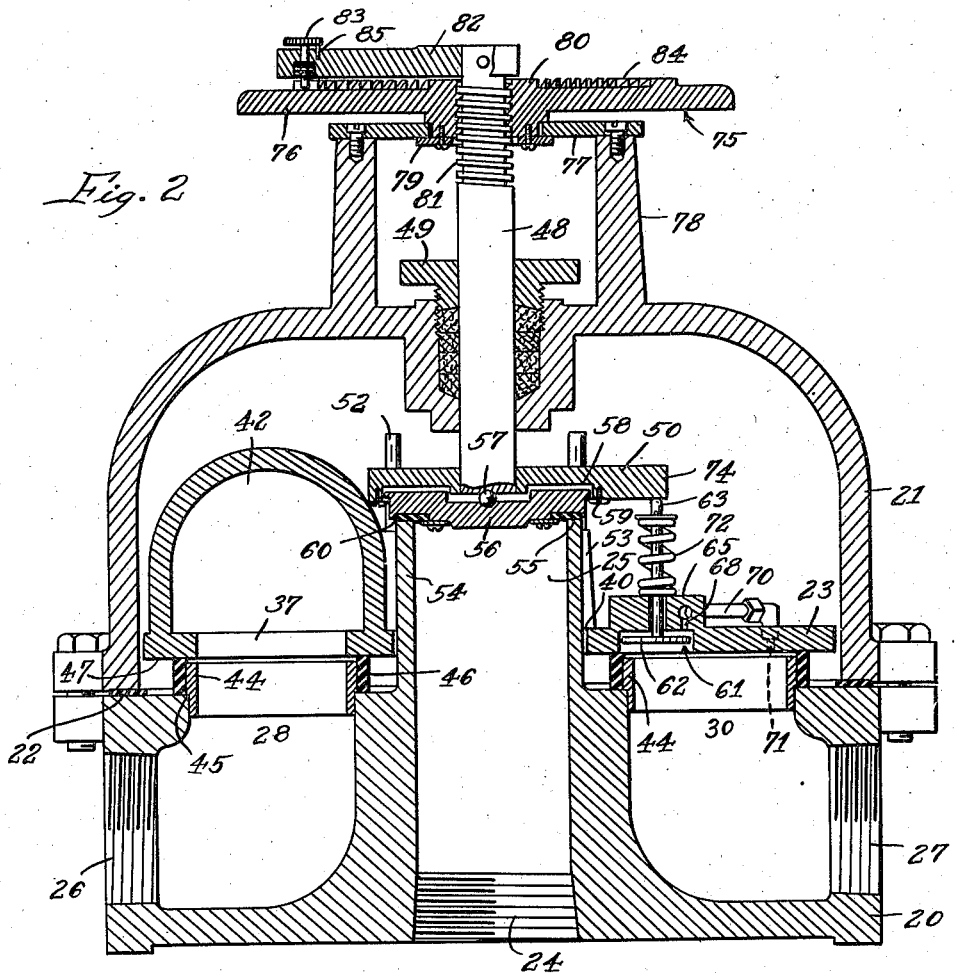
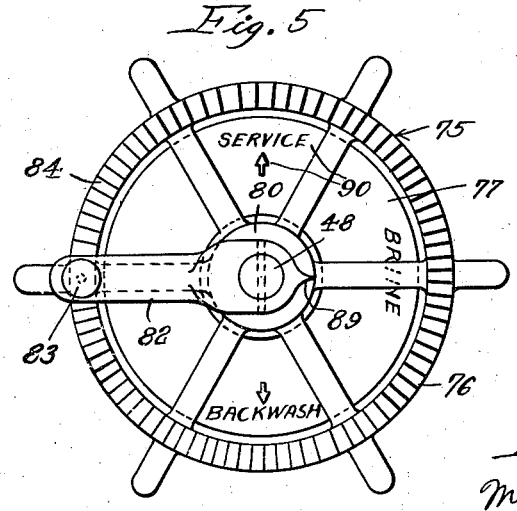
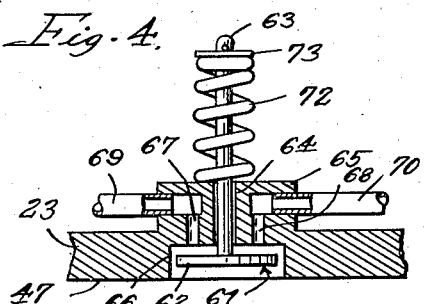

April 16, 1946.    C. T. McGILL ET AL    2,398,437
MULTIPORT VALVE
Filed Aug. 24, 1942    6 Sheets-Sheet 3
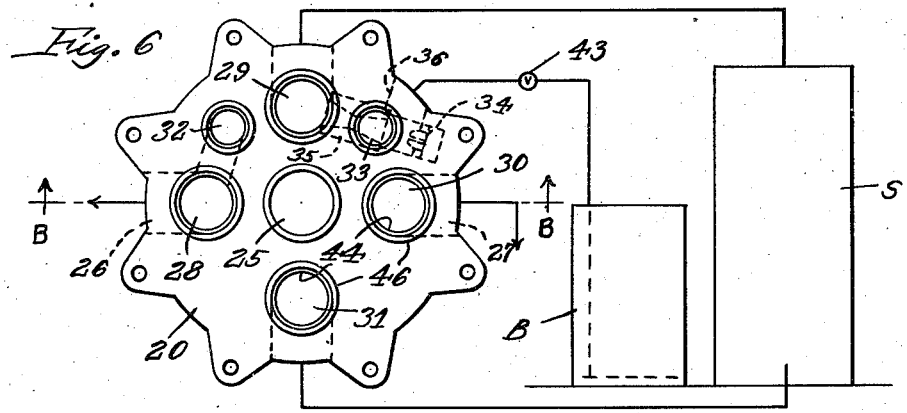
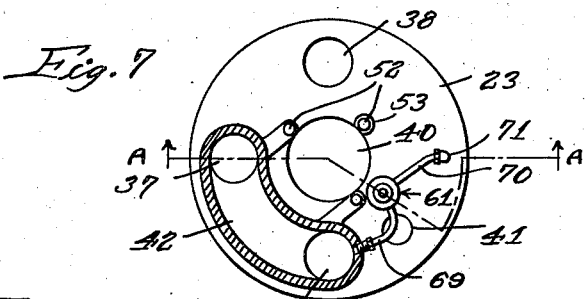
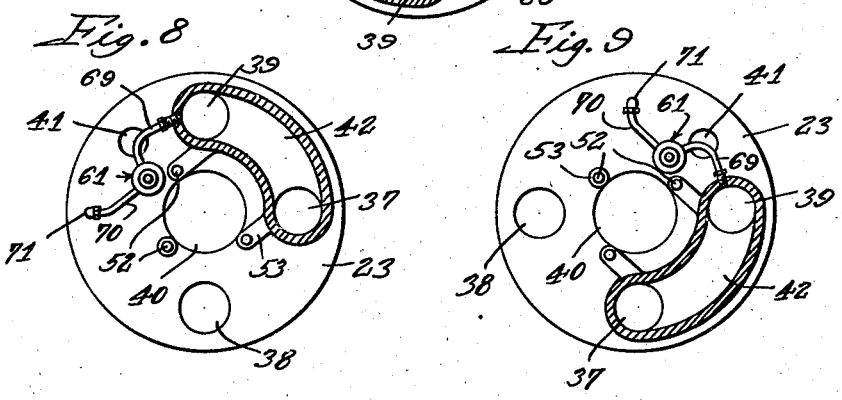
Inventors:
Chester T. McGill
DeWayne Wessel
Morris W. Smith
By
McCanna, Wintercorn & Morsbach Attys.

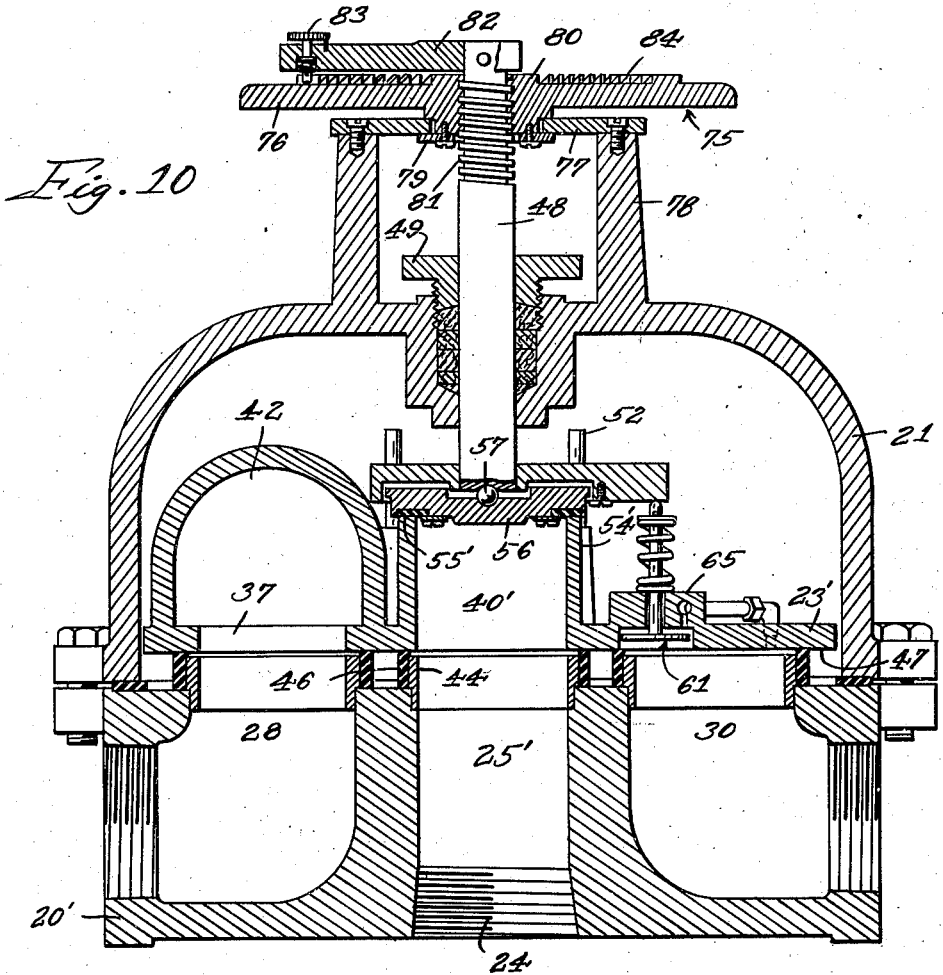

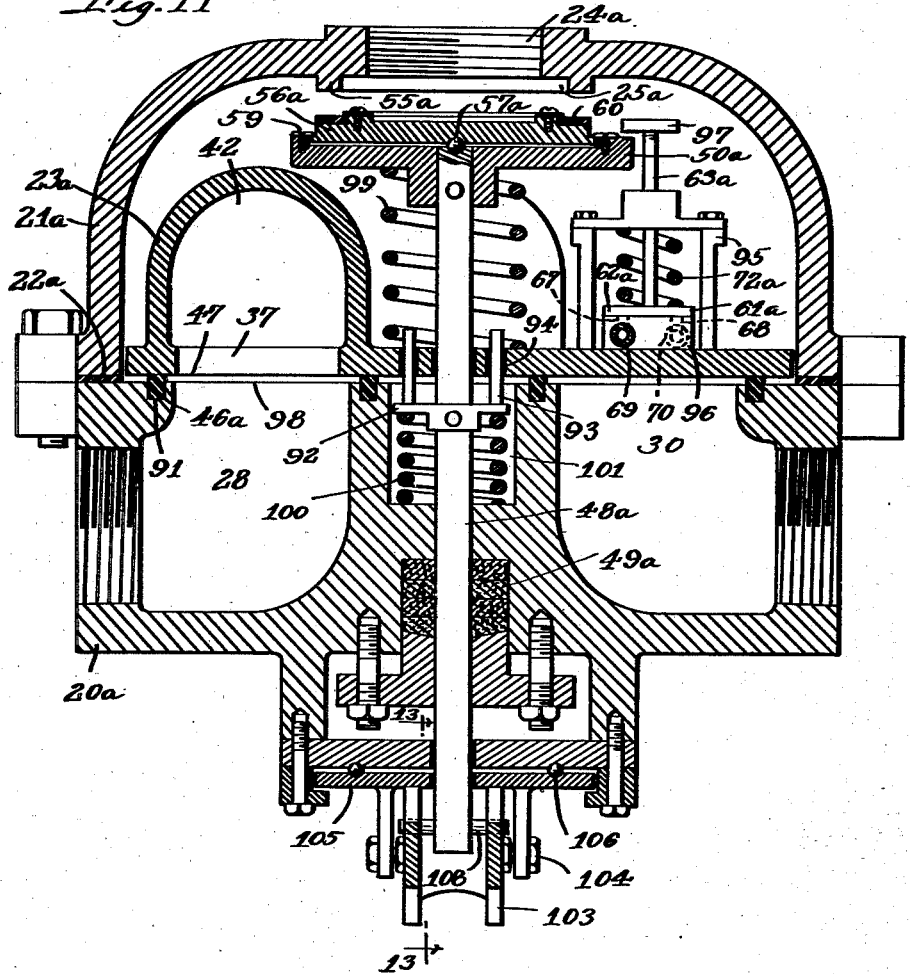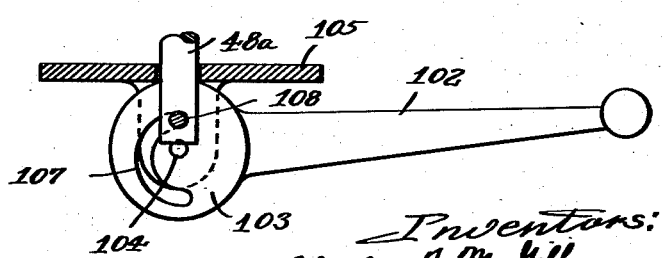

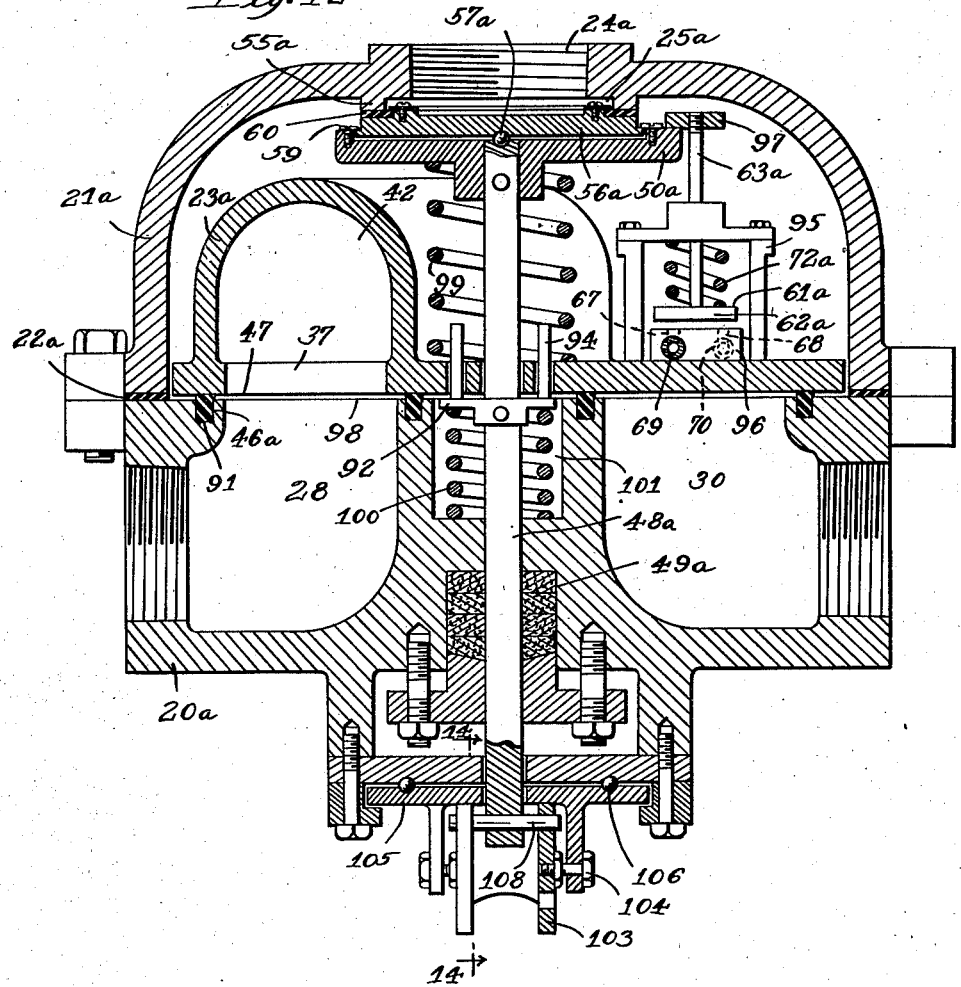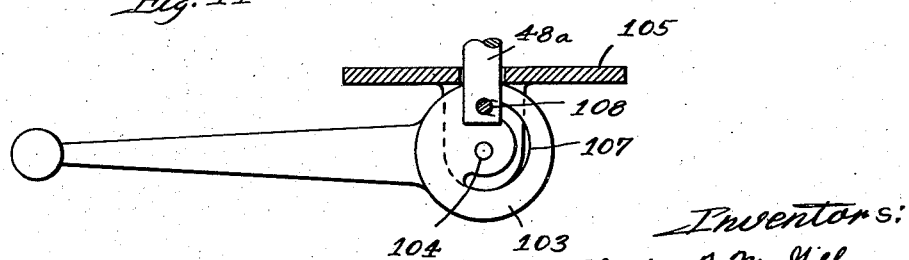

Patented Apr. 16, 1946

2,398,437

UNITED STATES PATENT OFFICE 2,398,437

MULTIPORT VALVE

Chester T. McGill, De Wayne Wessel, and Morris W. Smith, Elgin, Ill., assignors to Elgin Softener Corporation, Elgin, Ill., a corporation of Illinois Application August 24, 1942, Serial No. 455,896

29 Claims. (Cl. 277—25)

This invention relates to multiport valves.

Multiport valves have heretofore been so designed and constructed that the stem plate was lifted from the seat before turning the same to another position, the lifting being with a view to eliminating wear and tear on the seat or gasket in the turning of the stem plate from one position to another. In some cases the stem plate was adapted to be turned without lifting and it would accordingly drag on the gasket or gaskets, and in such cases where there was heavy hydraulic pressure, there was accordingly increased drag on the gaskets, making it harder to turn the stem plate besides tending to damage the gaskets. On larger sized valves of both types mentioned, it has been necessary to provide an ordinary hand operated valve on the inlet side to shut off the flow before the stem plate was shifted from one position to another. However, even though this hand valve was closed, it was found to be difficult on larger valves to lift the stem plate or rotate it due to the hydraulic pressure left on the stem plate after the hand valve was closed. In those cases where a hand valve was not used on the inlet side of the multiport valve, the shifting of the valve from one position to another caused a surge and sometimes a very violent water hammer. Oftentimes when the multiport valve was shifted from service position to backwash position, the flow of water through the valve and through the water conditioning unit, such as a filter or softener, came with such a sudden inrush into the bottom of the water conditioning unit and out from the top thereof that the bed was apt to be lifted and mineral lost to the drain. Packed beds under such conditions were apt to have the gravel distributing bed therebeneath disrupted and shifted from its normal relationship to the mineral above.

It is, therefore, the principal object of our invention to provide new and improved multiport valves which are not subject to these objections and which provide within the multiport valve itself the facilities for shutting off the flow of incoming water as well as the relief of hydraulic pressure from the stem plate automatically preliminary to the shifting of the valve from one position to another, thereby obviating the necessity for a separate hand valve which a careless or uninformed operator might fail to close at the proper time.

In many applications of multiport valves it has been necessary to provide a restriction or valve means for regulating the flow of water, because of the difference in available water pressure in different installations. It is, therefore, another important object of our invention to provide the shut-off valve so arranged that it can be used for regulating the flow as well as for shutting off the flow.

Another object of the invention is to provide a multiport valve in which the stem plate is held in a sealed operative position in supported relation to the body member either by hydraulic pressure alone or in conjunction with hold-down spring means, and in which, by virtue of the shut-off valve means and pressure relief valve means operated prior to the shifting of the stem plate, the latter is arranged to be shifted from one position to another without the necessity of lifting, there being no appreciable drag on the turning of the stem plate and no danger of damage to the gasket means under the improved operating conditions afforded with our invention.

Still another object consists in the provision of multiport valves of the kind mentioned, in which the operating stem for turning the stem plate has a direct operating connection with the shut-off valve and also a more or less direct operating connection with the pressure relief valve, so that in the closing of the shut-off valve preliminary to the turning of the stem plate the relief valve is automatically opened.

Still another object consists in the provision of a separate control plate on the operating stem, having a sliding driving connection with the stem plate on the one hand and having the shut-off valve carried thereon on a universal ball bearing mounting, so that the shut-off valve can be closed tightly without interfering with the rotation of the control plate relative to the shut-off valve and so that when the shut-off valve is held tightly closed there is minimum resistance to turning of the stem plate, the control plate being further arranged to engage the stem of the relief valve and open said valve in the seating of the shut-off valve.

Another object consists in the provision of a new and improved type of seal around the ports in the body member which simplifies and reduces the cost of the valve construction and obtains better all around performance.

A further object consists in the provision of a valve operating cam lever operatively connected with the valve so that pivotal movement causes operation of the shut-off valve and pressure relief valve and rotary movement causes rotary shifting of the stem plate from one position to another, while the shut-off valve is closed and the relief valve is opened.

The invention is illustrated in the accompanying drawings, in which—

Figs. 1 and 2 are vertical sections through a multiport valve made in accordance with our invention, these sections being on the broken line A—A of Fig. 7, so far as the stem plate is concerned, and on line B—B of Fig. 6 for the body, Fig. 1 showing the valve in normal operating condition, and Fig. 2 showing the shut-off valve closed and pressure relief valve opened preparatory to the shifting of the stem plate from one position to another;

Fig. 4 is a sectional detail of the pressure relief valve on a slightly enlarged scale;

Fig. 5 is a plan view of the valve operating means;

Fig. 6 is a plan view of the valve body with the cover and stem plate removed and indicating diagrammatically the pipe connections used in conjunction with the valve in a water softener installation;

Figure 1:
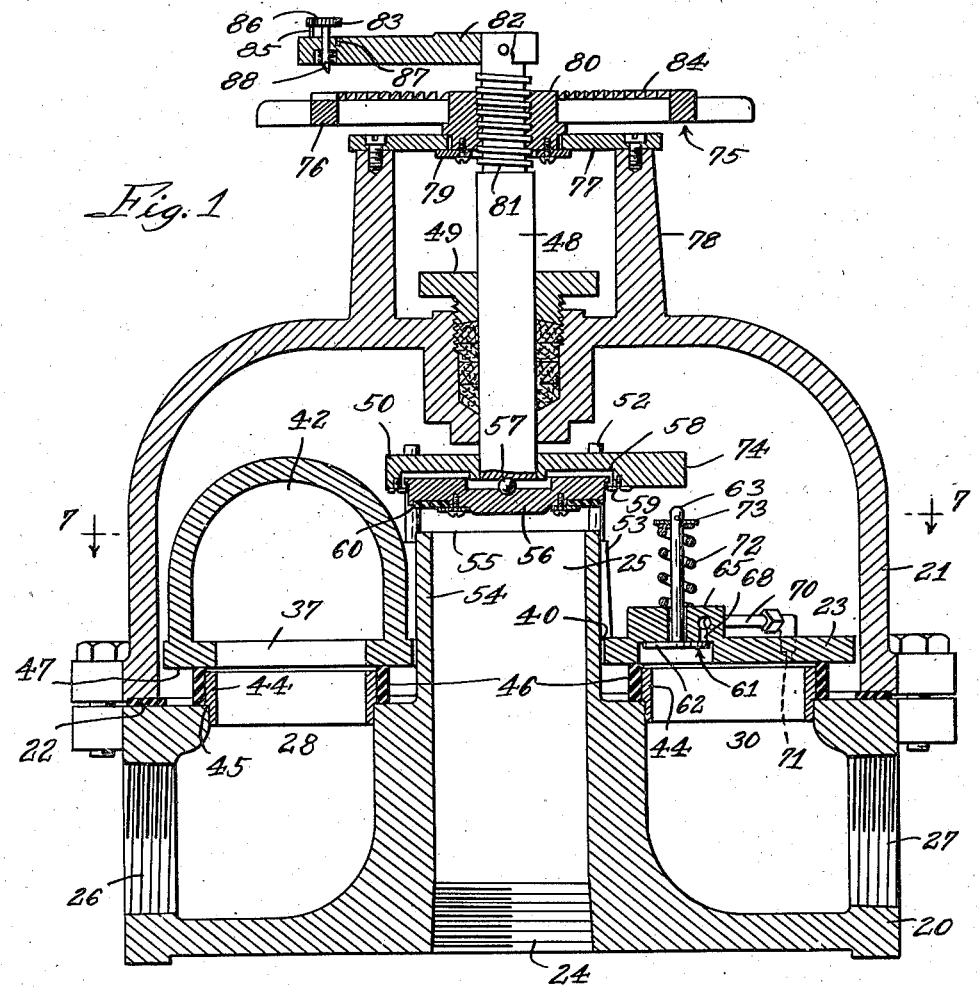
Figure 3:
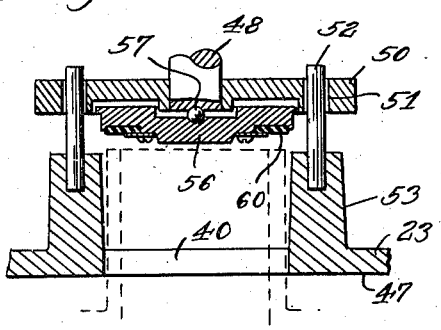
Fig. 3 is a sectional detail showing the sliding driving connection between the plate on the operating stem and the stem plate, this detail being in a plane at an angle to the plane of the section Fig. 1.

Figs. 7, 8, and 9, are top views of the stem plate showing a portion thereof in horizontal section on the line 7—7 of Fig. 1, Fig. 7 being the service position of the stem plate and Figs. 8 and 9 the backwash and salt wash or brine positions, respectively;

Fig. 10 is a view similar to Fig. 2, showing a modified or alternative construction;

Figs. 11 and 12 are central vertical sections through another multiport valve made in accordance with our invention, Fig. 11 showing the valve in normal operating condition, and Fig. 12 showing the shut-off valve closed and pressure relief valve opened preparatory to the shifting of the stem plate from one position to another, and Figs. 13 and 14 are sectional details of the valve operating means on the lines 13—13 and 14—14 of Figs. 11 and 12, respectively.

Similar reference numerals are applied to corresponding parts throughout the views.

Referring first briefly to Figs. 1 and 2, the valve shown bears a general resemblance to that disclosed in McGill Patent 2,209,992, the reference numeral 20 designating the stator or body member of the valve on which a cap or cover 21 is suitably secured, compressing a gasket 22 therebetween to prevent leakage. The cover encloses the rotor or stem plate 23, and this stem plate in its three operative positions—service, backwash, and salt wash or brine—controls the flow of water through the valve by providing a different system of communication between the various ports in the body 20 in each of the three positions. It should be understood that although the valve is one especially designed for use in controlling the flow of fluids to and from a zeolite water softener, the invention is not limited to that or any other specific application but is applicable to valves generally.

The body 20 has a central axial threaded opening 24 in the bottom thereof for connection with the raw water supply pipe. The port 25 communicating with this opening will therefore be referred to as the pressure or inlet port. Four radial threaded openings, like those shown at 26 and 27 in Figs. 1 and 2, are provided in the body 90° apart in circumferentially spaced relation for connection to pipes that conduct fluid into and out of the valve. There are four equidistantly spaced main ports 28, 29, 30, and 31 in the body 20 communicating with these openings opening to the flat top face of the body, all at the same radial distance from the center port 25. An auxiliary port 32 communicates with the port 28. Another auxiliary port 33 communicates with a nozzle 34 which discharges water through a Venturi tube 35 into the port 29, whereby to siphon brine from a brine tank B through a cored passage 36 in the body 20, in the manner clearly disclosed in McCanna Patent 2,209,989. The stem plate 23 has three ports 37, 38, and 39 provided therein 90° apart adapted to register with three of the main ports 28, 29, 30, and 31 in different positions of the stem plate. There is also a central port 40 in the stem plate which registers with the port 25 in the body member in all positions of the stem plate, and a smaller port 41 in radially spaced relation to the center port arranged to register with the auxiliary port 32 in the backwash position of the stem plate and with the auxiliary port 33 in the salt wash or brine position of the stem plate. The ports 37 and 39 previously mentioned are interconnected by a cored passage 42 in the stem plate.

The operation of the valve as thus far described can be understood by reference to Figs. 6 to 9. In the normal softening operation, the incoming raw water from the pressure or supply port 25 flows into the cover 21, as should be clear from a study of Fig. 1, and the raw water leaves the valve through the ports 38 and 29 and enters the top of the softener S for passage downwardly through the bed of water softening material therein. The softened water leaving the bottom of the softener re-enters the valve and flows through communicating ports 31 and 39, and through the passage 42, and out of the valve through communicating ports 37 and 28 to the service system. This flow continues until the water softener requires regeneration, whereupon the operator, as will later appear, shifts the stem plate 23 to the backwash position shown in Fig. 8, 180° removed from the service position shown in Fig. 7. During backwash the incoming raw water from the pressure or supply port 25 flows through communicating ports 38 and 31 out of the valve and into the bottom of the softener S for passage upwardly through the bed of water softening material so as to break up the bed preparatory to the salt wash flow and also wash out from the top of the tank whatever sediment accumulated on the top of the bed during the softening operation. The water leaving the top of the softener re-enters the valve through the communicating ports 29 and 39 and flows through the passage 42 and out of the valve through communicating ports 37 and 30 to the drain. This flow is continued for a predetermined time, sufficient to thoroughly cleanse the bed and prepare it for the salt wash. During this interval raw water may be by-passed to the service system by virtue of the fact that the port 41 in the stem plate 23 registers with the port 32 and, hence, also with the port 28 communicating with the service system. At the conclusion of the backwash flow, the operator, as will later appear, shifts the stem plate 23 to the salt wash or brine position shown in Fig. 9, which is 90° removed from the backwash position shown in Fig. 8. During the salt wash, the incoming raw water is delivered through the port 41 into the port 33 so as to cause flow from the nozzle 34 through the Venturi tube 35 and out of the valve through port 29 into the top of the softener tank S. A valve 43 in the pipe extending from the valve to the brine tank B is opened at this time so that brine may be siphoned from the brine tank and discharged with the water into the top of the softener S. The mixture of brine and water flowing downwardly through the bed of water softening material regenerates the same, and the spent brine and released calcium and magnesium is discharged from the bottom of the softener and re-enters the valve through communicating ports 31 and 37, and is conducted through the passage 42 and out to the drain through communicating ports 39 and 30. This salt wash flow continues until the level in the brine tank B drops to a predetermined point, whereupon the valve 43 is closed so that no more brine will be used. During this salt wash flow, raw water may be by-passed to the service system by virtue of the fact that the port 38 in the stem plate 23 registers with port 28 in the body. After the valve 43 has been closed, the raw water flow is continued downwardly through the softener S and out to the drain until the water discharged to the drain tests soft, whereupon the operator, as will later appear, shifts the stem plate 23 back to the service position shown in Fig. 7. When the valve is in the service position, the supply of water in the brine tank B may be replenished by opening the valve 43, raw water under those conditions being delivered to the brine tank through communicating ports 38 and 29 and through the Venturi tube 35 and passage 36 and out through the pipe extending to the brine tank. When the water reaches the proper level in the brine tank, the valve 43 is closed and, assuming there is sufficient salt present in the brine tank, a supply of brine will be on hand ready for the next regeneration.

The ports 28—33 in the body 20 have rings 44 pressed therein and projecting upwardly from the body a uniform height, determined by annular shoulders 45 on the outside thereof engaging the top face of the body. These rings have rubber seal rings 46 surrounding the same and seated on the flat top face of the body with their upper ends projecting slightly beyond the ends of the rings 44 for sealing contact with the flat bottom face 47 of the stem plate 23. The rings 46, therefore, perform the sealing function, while the rings 44 serve positively to limit compression of the rings 46, thus preventing damage thereto. With this arrangement there is no necessity for lifting the stem plate before it is turned from one position to another. The fact that the hydraulic pressure on the stem plate is relieved preliminary to the turning of the stem plate, as will soon appear, greatly reduces the drag which there would otherwise be of the stem plate on the gasket rings, and the stem plate can, therefore, be turned with less effort and with less likelihood of damage to the gasket rings. It should be understood that instead of the rings 46 mounted on the rings 44, we may employ gasket or seal rings like those indicated at 46a in Figs. 11 and 12 entered in annular grooves 91 provided in the body in substantially concentric relation with the body ports. The advantages of that type of seal are described hereinafter.

The operating stem 48 for the stem plate 23 extends through a stuffing box 49 in the top of the cover 21 and has a plate 50 suitably secured on the inner end thereof to turn or move endwise therewith. This plate has holes 51 in circumferentially spaced relation, which receive with a free sliding fit pins 52 projecting upwardly from bosses 53 provided on the stem plate around its center port 40, as indicated in Figs. 3 and 7 to 9. A tubular neck portion 54 is provided on top of the body 20 at the center thereof surrounding the central pressure or supply port 25, and the central port 40 in the stem plate is large enough to accommodate this neck portion freely. A seat 55 is formed on the upper end of the neck portion 54 for the shut-off valve 56 which is of circular disk form and universally rotatably mounted on the plate 50 for axial movement with the plate toward and away from the seat 55. A bearing ball 57 seated in central recesses in the end of the stem 48 and top of the valve disk permits the valve 56 to adjust itself with respect to the stem 48 for uniform engagement with the seat 55. The valve disk is held in a circular recess 58 in the bottom of the plate 50 by means of screws 59 which engage the stepped rim portion of the valve disk, as shown. A compressible gasket ring 60 held in place on the bottom face of the valve disk insures a water-tight seal when the shut-off valve 56 is closed. It should be clear that when the stem 48 holds the shut-off valve 56 closed, as in Fig. 2, the plate 50 may be turned with respect to the shut-off valve with the stem 48 to shift the stem plate 23 from one operating position to another. The parallel pins 52 maintain a sliding operating connection between the plate 50 and the stem plate 23 in all positions of adjustment of the stem 48, as should be evident from Figs. 1, 2, and 3. The fact that the shut-off valve 56 is closed before the stem plate 23 is moved is of great advantage for two reasons; one being that it avoids the wasting of water, and the other being that it prevents objectionable water-hammer, otherwise common in the operation of valves of this general type. While it would be feasible to turn the stem plate without relief of the hydrostatic pressure after the shut-off valve 56 is closed, because as soon as the stem plate was shifted the hydrostatic pressure would be released to the drain 30, we prefer, as pointed out hereinafter, to provide a separate pressure relief valve for that purpose.

The present valve includes a pressure relief valve 61 mounted on the stem plate 23, which is arranged to be opened automatically when the shut-off valve 56 is closed, to place the inside of the cover 21 and all portions of the system communicating therewith at atmospheric pressure by establishing communication therefor with the drain port 30 in the body 20. The relief of pressure in the cover by the opening of the valve 61 is important only when the stem plate is in the service position, speaking with reference to a softener installation of course, because in that position the cover has no communication with the drain unless the relief valve 61 is open. In the other positions of the stem plate, the cover communicates through the softener with the drain, because in the backwash position the top of the softener is connected to the drain and the bottom of the softener to the interior of the cover, and in the brine and rinse position the bottom of the softener is connected to the drain and the top of the softener to the interior of the cover. Hence, with the water pressure source cut off and the inside of the cover at atmospheric pressure the stem plate 23 can be turned easily and wear and tear on the gasket rings 46 is reduced to a minimum, and there is furthermore no objectionable water hammer, and the other objections previously mentioned are eliminated. In view of the fact that the relief of pressure in the cover is important only in the service position, the connection 69 hereinafter described is not essential and may be omitted. The pressure relief valve is herein disclosed as of the poppet type, having a circular disk head 62 on the lower end of a stem 63 that projects freely through a hole 64 in a boss 65 provided in the stem plate 23. The head 62 of the valve is housed within a recess 66 in the bottom of the stem plate, so that there is nothing projecting below the plane of the stem plate that would come into contact with the gasket rings and interfere with the free turning of the stem plate. There are two ports 67 and 68 in the boss 65 parallel to the hole 64, and these ports as well as the end of the hole are closed by the head 62 when the valve is seated, as shown in Fig. 1. The port 67 communicates with a tube 69 extending from the boss 65 to the passage 42 in the stem plate. The other port 68 has a tube 70 communicating therewith, which extends from the boss 65 to a hole 71 in the stem plate spaced midway between the ports 38 and 39 and diametrically opposite the port 37. In that way in the service position of the stem plate 23, when the pressure relief valve is opened, communication is established with the drain port 30 in the body 20 for the space inside the cover 21, through the hole 64 and port 68. At the same time communication is established with the drain port 30 for all portions of the softener and service system communicating with the passage 42, through the ports 67 and 68. It should be obvious that very little water will flow out the drain in this pressure relief, assuming there are no open faucets in the system. Consequently there is no appreciable wasting of water. The valve 61 is normally held closed under action of a spring 72, which acts between the top of the boss 65 and a washer 73 held on the upper end portion of the stem 63 by a crosspin. A radial projection 74 on the plate 50 is disposed over the stem 63 of the valve 61, and when the shut-off valve 56 is closed by downward movement of the stem 48 and plate 50, the projection 74 on the plate strikes the end of the stem 63 and opens the valve 61 against the action of the spring 72, as clearly appears in Fig. 2. The opening of the pressure relief valve is therefore coincidental with the closing of the shut-off valve.

The valve operating means, indicated generally by the reference numeral 75, which forms part of the subject matter of a continuation-in-part application of Harry Mansen and Clarence J. Yaeger, Serial No. 601,784, filed June 27, 1945, is so designed and constructed that there is definite assurance of the closing of the shut-off valve 56 and opening of the relief valve 61 before the stem plate 23 is turned. The valve operating means 75 comprises an operating wheel 76 rotatably mounted on an index plate 77 suitably supported on top of the cover 21, as indicated at 78. A plate 79 fastened to the bottom of the hub 80 of the wheel 76 retains the hub in the central opening in the plate 77, while, of course, permitting free rotation of the wheel with respect to the plate 77. The upper end portion 81 of the operating stem 48 is threaded and threads in the hub 80. A radially extending arm 82 is secured on the upper end of the stem 48 above its threaded portion 81 and carries a spring pressed pawl 83 on the outer end thereof arranged to engage ratchet teeth 84 provided on the upper face of the rim portion of the wheel 76. The pawl has a pin 85 projecting downwardly from the bottom of the headed end 86 of the pawl, and this pin is arranged to fit slidably in a hole 87 provided therefor in the arm 82, as shown in Fig. 2, except when the pawl is held retracted, as shown in Fig. 1.

With this construction, assuming the parts to be in the relationship shown in Fig. 1, with the pawl 83 held retracted, the operator preparatory to operating the multiport valve rotates the wheel 76 in a clockwise direction in order to cause the stem 48 to move downwardly to close the shut-off valve 56 and open the relief valve 61. It should be clear that the valve 56 when left in the open position shown in Fig. 1 can be set at a higher or lower elevation by rotation of the wheel 76 to regulate the flow of water used in the service position and during back-washing. In many other valves with which we are familiar, a special restriction or regulating valve is required to control the flow of water, but in the valve of our invention the valve 56 does the controlling as well as shutting off of the raw water supply. After the shut-off valve has been closed and the pawl 83 has been turned around to its normal operative position in relation to the ratchet teeth 84 and interlocked therewith so as to positively connect the arm 82 with the wheel 76, the stem plate 23 can be turned with the wheel in a clockwise direction from the service position to the backwash position. In this operation, the pointer 89 on the hub end of the arm 82 will serve to indicate to the operator the position to which the valve is moved, captions and other indicia being provided on the index plate 77, as indicated at 90, to mark the different positions. After the stem plate is moved from the service position to the backwash position, the shut-off valve 56 is opened again and the pressure relief valve 61 is closed again, the shut-off valve 56 being backed away by counterclockwise rotation of the wheel 76 after the pawl 83 has been retracted to permit free turning of the wheel 76 relative to the arm 82, although it should be clear that counterclockwise rotation of the wheel relative to the arm is permitted by the pawl even if the operator should happen to forget to retract it. At the end of the backwash flow, the shut-off valve 56 is again closed and the relief valve 61 is again opened, similarly as at the commencement of the regeneration, and then the stem plate is turned from the backwash position to the brine position. After that the shut-off valve 56 is again unseated and the pressure relief valve 61 seated for the duration of the brine and rinse flows. Finally at the conclusion of the regeneration, the shut-off valve 56 is again closed and the relief valve 61 opened preparatory to the shifting of the stem plate back to the service position, and when that has been accomplished, the shut-off valve 56 is again opened and the relief valve 61 closed for the duration of the normal softening operation.

The valve shown in Fig. 10 is closely similar to that shown in Figs. 1 to 9, but has a central pressure or supply port 25' in the flat top face of the body 20', a ring 44 being pressed into the port 25' and having a seal or gasket ring 46 surrounding the same, similar to the rings 46 provided in connection with the rings 44 on the other body ports 28—32. The stem plate 23' in this valve has a flat bottom surface 47 for sealing engagement with all of the gasket rings 46, and has a neck 54' surrounding its central port 40' and providing a seat 55' on the top thereof for cooperation with the shut-off valve 56. This valve is otherwise the same as the valve shown in Figs. 1 to 9. The operation of this valve is the same as the other in so far as closing of the shut-off valve and opening of the relief valve prior to turning of the stem plate is concerned, the only difference being that whatever pressure is exerted on the shut-off valve 56 to hold it closed is transmitted to the stem plate instead of to the body of the valve.

The valve shown in Figs. 11 and 12 comprises a body or stator member 20a on which a cap or cover 21a is secured compressing a gasket 22a therebetween to prevent leakage. The cover encloses the rotor or stem plate 23a, which in this valve is operated by a stem 48a extending downwardly through the body instead of upwardly through the cover. The cover 21a has a central axial threaded opening 24a for connection with the raw water supply pipe. The port 25a communicating with this opening is, therefore, the pressure or inlet port. Otherwise this valve has the same port arrangement generally as the valves shown in Figs. 1 and 10, the body 20a having ports 28—33 similarly as the body 20 and the stem plate 23a having ports 37, 38, 39, and 41 similarly as the stem plate 23, with the ports 37 and 39 interconnected by an arcuate passage 42 cored in the stem plate. Provision of the pressure or inlet port in the cover instead of in the body enables reduction in the diameter of the body and cover so that a much more compact and economical valve is obtained. The operating stem 48a extends through a stuffing box 49a in the center of the body and has a plate 50a suitably secured on the inner end thereof to turn or move endwise therewith. The shut-off valve 56a is universally rotatably mounted on the plate 50a, similarly as the shut-off valve 56 on the plate 50, for axial movement with the plate 50a toward and away from the seat 55a provided on the cover around the pressure port 25a. The bearing ball 57a seated in central recesses in the end of the stem and bottom of the valve disk permits the valve 56a to adjust itself with respect to the stem 48a for uniform engagement with the seat 55a. When the stem 48a holds the shut-off valve 56a closed, as in Fig. 12, the plate 50a may be turned relative to the shut-off valve with the stem 48a to shift the stem plate 23a from one operating position to another. The operating connection between the stem 48a and stem plate 23a consists of a crosshead 92 on the stem having parallel pins 93 reciprocable freely in parallel holes 94 provided in the central portion of the stem plate. With this arrangement the stem maintains its operating connection with the stem plate in different positions of endwise movement of the stem, such movement of the stem being required for the operation of the shut-off valve 56a and pressure relief valve 61a.

The pressure relief valve 61a is mounted on the stem plate 23a and is arranged to be opened automatically when the shut-off valve 56 is closed, whereby to place the inside of the cover 21a and all portions of the system communicating therewith at atmospheric pressure by establishing communication therefor with the drain port 30 in the body 20a. In that way the stem plate 23a can be turned easily and wear and tear on the gasket or seal rings 46a is reduced to a minimum, and there is furthermore no objectionable water hammer, and the other objections previously mentioned are avoided. In the present valve the pressure relief valve 61a has a disk head 62a on the lower end of the stem 63a that is mounted for reciprocation in a cage 95 provided on top of the stem plate. A spring 72a tends normally to keep the valve seated on a boss 96 projecting from the stem plate, but the valve is arranged to be unseated by engagement of the plate 50a with a head 97 provided on the upper end of the stem 63a, in the manner shown in Fig. 12. The boss 96 has two ports 67 and 68 provided therein arranged to be closed by the head 62a when the valve 61a is seated, as shown in Fig. 11. The port 67 communicates with a tube 69 extending from the boss 96 to the passage 42 in the stem plate, the same as in the valves of Figs. 1 and 10. The other port 68 has a tube 70 communicating therewith which extends from the boss 96 to a hole 71 in the stem plate spaced midway between the ports 38 and 39 and diametrically opposite the port 37, the same as in the valves of Figs. 1 and 10. In that way when the stem plate 23a is in the service position and the pressure relief valve 61a is open, as illustrated in Fig. 12, communication is established with the drain port 30 for the space inside the cover 21a through the port 68, and at the same time communication is established with the drain port 30 for all portions of the service system communicating with the passage 42, through the ports 67 and 68. Very little water will flow out the drain in this relief of pressure, assuming there are no faucets open in the system. Consequently there is no appreciable wasting of water. The pressure relief valve is, of course, open coincidentally with the closing of the shut-off valve.

The gasket or seal rings 46a, which are preferably of rubber, but may be of leather or even fiber material, are mounted in annular grooves 91 provided in the body 20a in substantially concentric relation to the ports 28—33. These grooves are all of substantially uniform depth in relation to the flat top surface 98 of the body, and the rings are all of substantially uniform height so as to project to the same extent above the surface 98 and all be subjected to substantially uniform compression by the flat bottom surface 47 of the stem plate. The fact that in the present valve the pressure inside the cover is relieved before the stem plate is turned makes it relatively unimportant to maintain much, if any, clearance between the stem plate and the body so long as the rings 46a in uncompressed condition project sufficiently from the body to be assured of sufficient compression by the stem plate to prevent leakage between ports. There is an appreciable saving in cost with this construction, because the grooves 91 can be cut at small expense and special supporting rings for the seal rings are eliminated. Furthermore, it should be clear that with this arrangement, the engagement of the stem plate with the body limits the compression of the seal rings 46a so that there is no danger of their being damaged. We have found that rings 46a of very substantial hard rubber can be used to advantage in this valve. Leather seal rings are also satisfactory, and even fiber seal rings.

A light coiled compression spring 99 is provided around the stem 48a between the plate 50a and the stem plate 23a to hold the stem plate in engagement with the seal rings 46a under light pressure when the shut-off valve 56a has been closed and pressure relief valve 61a opened. A heavier coiled compression spring 100 is provided around the stem 48a in a recess 101 in the body and bears against the crosshead 92 to hold the shut-off valve 56a closed tightly when the stem 48a has been moved to the position shown in Fig. 12 preparatory to shifting the stem plate from one position to another.

Referring mainly to Figs. 13 and 14, the valve operating means provided on the valve shown in Figs. 11 and 12 comprises a hand lever 102 having a pair of cams 103 provided on its forked inner end pivoted, as indicated at 104, on a turntable 105 rotatably mounted on the bottom of the body 20a, preferably on anti-friction bearings 106. Slots 107 in the cams 103 slidably receive the ends of a crosspin 108 on the lower end of the stem 48a. These slots are in eccentric relation to the pivots 104, so that when the lever 102 is in one extreme position, shown in Fig. 13, the stem 48a is held in its lower extreme position against the compression of the springs 99 and 100, holding the shut-off valve 56a in the open position. On the other hand, when the lever 102 is swung through 180° to its other extreme position, shown in Fig. 14, the stem 48a moves upwardly under the action of the springs 99 and 100 to the position shown in Fig. 12, closing the shut-off valve 56a and opening the pressure relief valve 61a. The operating connection between the lever 102 and stem 48a afforded by the pin 108 and slots 107 also permits rotation of the stem plate 23a by means of the lever 102 from one operating position to another, the turn-table 105 in that operation turning easily with respect to the body 20a on its anti-friction bearings 106. The springs 99 and 100 will, of course, maintain the stem 48a under sufficient end thrust even in the closed position of the shut-off valve to maintain the turn-table 105 in proper working relation to its bearings 106.

It is believed the foregoing description conveys a good understanding of the objects and advantages of our invention. The appended claims have been drawn with a view to covering all legitimate modifications and adaptations.

We claim:

1. The combination in a plate type valve of a body member carrying a housing and having a plurality of ports, a movable valve member within the housing having ports adapted to register with the first mentioned ports to establish different communication between the ports in the body member in different positions of the valve member, means for moving the valve member relative to the body member to different positions, and control valve means operable by movement of the last mentioned means in one direction for shutting off fluid delivery to said valve and opening the interior of said valve to a drain at low pressure preparatory to the movement of the valve member from one position to another, said control valve means being operable by movement of said last mentioned means in the opposite direction to open fluid delivery to said valve and close off communication between the interior of said valve and the drain.

2. In a plate type valve, the combination of a ported body member, a ported stem plate adapted to effect different communication between the ports in the body member in different positions of the plate, a cover member on the body member enclosing the plate, one of said members having a pressure port normally communicating with the inside of the cover member, one of the ports in the body member being a low pressure drain port, means for turning the plate from one position to another, a shut-off valve operable by the last mentioned means to close the pressure port, and a pressure relief valve also operable by the last mentioned means for opening the low pressure drain port into communication with the inside of the cover member preparatory to the turning of the plate.

3. In a plate type valve, the combination of a ported body member, a ported stem plate adapted to effect different communication between the ports in the body member in different positions of the plate, a cover member on the body member enclosing the plate, one of the ports in the body member being a low pressure drain port, a pressure relief valve for establishing communication between said last named port and the inside of the cover member and other ports in the body member, and a single manually operable means for turning the plate from one position to another and automatically opening the relief valve prior to such movement.

4. In a plate type valve, the combination of a ported body member, a ported stem plate adapted to effect different communication between the ports in the body member in different positions of the plate, a cover on the body member enclosing the plate, one of said members having a pressure port normally communicating with the inside of the cover member, means for shifting the plate to different operative positions, and means operable by the last means independently of any movement of the stem plate for closing the pressure port prior to movement of said plate from one position to another.

5. In a plate type valve, the combination of a ported body member, a ported stem plate adapted to effect different communication between the ports in the body member in different positions of the plate, a cover member on the body member enclosing the plate, one of said members having a pressure port normally communicating with the inside of the cover member, whereby said plate is normally held seated under hydraulic pressure, rotary means adapted for turning said plate whereby to shift the plate to different operative positions, said rotary means being also axially reciprocable, and a pressure relief valve for relief of hydraulic pressure inside the cover member operable by the last mentioned means upon reciprocation thereof, whereby said plate is rotatable by said means substantially free of hydraulic pressure tending to hold the same seated.

6. In a plate type valve, the combination of a ported body member, a ported stem plate adapted to effect different communication between the ports in the body member in different positions of the plate, a cover on the body member enclosing the plate, one of the ports in the body member being a pressure port and normally communicating with the inside of the cover, an upstanding neck portion on the body member surrounding the pressure port and projecting upwardly through an opening in the plate and providing a valve seat on the outer end thereof, an operating stem reciprocable and rotatable in said cover in substantially coaxial relation with said neck portion, a plate on the inner end of said stem reciprocable and rotatable therewith, means providing a slidable operating connection between the latter plate and stem plate so as to permit endwise movement of the stem independently of the stem plate but permit rotation of the stem plate with the stem, a shut-off valve movable with the stem and the plate thereon toward and away from the seat on the upstanding neck, and means for reciprocating and rotating the stem.

7. A valve as set forth in claim 6, wherein another of the ports in the body member is a low pressure drain port, said valve including a pressure relief valve for establishing communication between said drain port and the inside of the cover, and means operable by engagement with the plate on the stem for opening said pressure relief valve.

8. In a plate type valve, the combination of a ported body member, a ported stem plate adapted to effect different communication between the ports in the body member in different positions of the plate, a cover on the body member enclosing the plate, one of the ports in the body member being a pressure port and normally communicating with the inside of the cover, an upstanding neck portion on the stem plate communicating with the pressure port and providing a valve seat on the outer end thereof, said pressure port having communication with said neck in all positions of rotation of the stem plate, an operating stem reciprocable and rotatable in said cover in substantially coaxial relation with said neck portion, a plate on the inner end of said stem reciprocable and rotatable therewith, means providing a slidable operating connection between the latter plate and stem plate so as to permit endwise movement of the stem independently of the stem plate but permit rotation of the stem plate with the stem, a shut-off valve movable with the stem and the plate thereon toward and away from the seat on the upstanding neck, and means for reciprocating and rotating the stem.

9. A valve as set forth in claim 8, wherein another of the ports in the body member is a low pressure drain port, said valve including a pressure relief valve for establishing communication between said drain port and the inside of the cover, and means operable by engagement with the plate on the stem for opening said pressure relief valve.

10. In a plate type valve, comprising a ported body member and a ported stem plate, separate and independent, compressible, resilient, tubular seats communicating with and projecting from the ports of one of said last two members so as to present longitudinally compressible end portions for engagement with and compression against flat seating surfaces provided on the other member to space the stem plate relative to the body member and establish sealed communication with the ports of the body member in different positions of rotation of the stem plate relative to the body member, a cover member on the body member enclosing the plate member, one of said members having a pressure port normally communicating with the inside of the cover member, whereby said stem plate is normally held seated under hydraulic pressure compressing said resilient tubular seats, means adapted for shifting the stem plate to different operative positions without lifting the same, means for closing the pressure port, and means for relieving pressure within the cover member when the last mentioned means is operated, whereby to permit turning of the plate substantially free of hydraulic pressure thereon.

11. The combination in a rotary plate type valve of a ported body member, a ported stem plate adapted to effect different communication between the ports in the body member in different positions of the plate, a cover member on the body member enclosing the plate, one of said members having a pressure port normally communicating with the inside of the cover member, an operating stem extending through the other of said members and having means for selectively reciprocating or rotating the same, means providing a slidable driving connection between said stem and said plate to permit reciprocatory movement of the stem with respect to the plate while maintaining an operating connection therewith for rotation thereof, one of the ports in the body member being a low pressure drain port, and a pressure relief valve movably mounted on the plate and operable in the reciprocatory movement of said stem to open the low pressure drain port into communication through said plate with the inside of the cover member preparatory to the turning of the plate with said stem.

12. A valve as set forth in claim 11, including a shut-off valve to close the pressure port movable with said stem toward and away from the pressure port in the reciprocatory movement of said stem.

13. A valve as set forth in claim 11, including a shut-off valve to close the pressure port movable with said stem toward and away from the pressure port in the reciprocatory movement of said stem, spring means normally urging the stem to move endwise in one direction, a manually operable hand lever for operating the stem in its reciprocatory and rotary movement, said lever being pivotally and rotatively mounted with respect to said cover and body members, and cam means rotatable with the hand lever and operatively connected with said stem to communicate reciprocatory movement to said stem in the pivotal movement of said hand lever and to communicate rotary movement to said stem in the rotative movement of said hand lever.

14. In a plate type valve, a ported body member, a ported stem plate rotatable with respect thereto to different operative positions to effect different communication between the ports in the body member in different positions of the plate, a cover on the body member enclosing the plate and having a pressure port in the central portion thereof, an operating stem reciprocably and rotatively mounted in the central portion of the body member and extending through the plate into said cover, a shut-off valve rotatably mounted on the end of said stem and arranged upon endwise movement of the stem in one direction to close the pressure port, a coiled compression spring acting between the shut-off valve and the plate to hold the latter seated under spring pressure when the pressure port is closed, one of the ports in the body member being a low pressure drain port, a pressure relief valve on the plate operable in the reciprocatory movement of the stem to open the low pressure drain port into communication with the inside of the cover preparatory to the turning of the plate, means providing a sliding driving connection between said stem and said plate, and means for communicating reciprocatory and rotary movement to said stem.

15. The combination in a rotary plate type valve of a body member carrying a housing and having a plurality of ports, a rotary member within the housing having ports adapted to register with the first mentioned ports to establish different communication between the ports in the body member in different positions of the rotor, means including a rotatable and axially movable stem for turning the rotor relative to the body member to different positions, said stem being freely movable axially relative to the rotor and being operatively connected to the rotor to communicate rotary movement thereto in the turning of the stem, and control valve means arranged to be closed and opened by said stem in its axial movement whereby to shut off fluid delivery to said valve preparatory to and before any movement of the rotor by said stem upon the axial movement of said stem in one direction and reopen fluid delivery to said valve upon axial movement of said stem in the opposite direction.

16. In a plate type rotary valve, the combination of a ported body member, a ported stem plate adapted to effect different communication between the ports in the body member in different positions of rotation of the plate, a cover member on the body member enclosing the plate, one of said members having a pressure port normally communicating with the inside of the cover member, said stem plate being adapted to be turned from one operative position to another, an axially reciprocable and rotatable stem slidably operatively connected with the plate for turning the plate from one position to another by rotary movement of said stem, and a valve operable by said stem by axial movement and arranged to open the interior of the cover to a low pressure space before rotary movement of the plate.

17. In a plate type valve, the combination of a ported body member, a ported plate member adapted to effect different communication between the ports in the body member in different positions of rotation of the plate member, a cover member on the body member enclosing the plate member, one of said members having a pressure port normally communicating with the inside of the cover member for delivery of fluid from a source of fluid supply under pressure, a valve for shutting off flow through the pressure port or regulating the flow therethrough, and interdependent means for turning said plate member and operating said valve, said means being so related to the plate member and valve that the valve may be given regulating movement independently of the plate member and the valve may be completely closed before the plate member is given movement.

18. In a plate type valve, the combination of a ported body member, a ported stem plate adapted to effect different communication between the ports in the body member in different positions of the plate, a cover member on the body member enclosing the plate, said body member having a pressure port normally communicating with the inside of the cover member, whereby said plate is normally held seated under hydraulic pressure, means adapted for turning said plate without unseating the same, whereby to shift the plate to different operative positions, and a shut-off valve operable by the last mentioned means for closing the pressure port prior to movement of said plate from one position to another.

19. In a plate type valve, comprising a ported body member and a ported stem plate, separate and independent, compressible, resilient, tubular seats communicating with and projecting from the ports of one of the last two members so as to present longitudinally compressible end portions for engagement with and compression against flat seating surfaces provided on the other member to space the stem plate relative to the body member and establish sealed communication with the ports of the body member in different positions of rotation of the stem plate relative to the body member, a cover member on the body member enclosing the stem plate, one of said members having a pressure port normally communicating with the inside of the cover member, whereby said stem plate is normally held seated under hydraulic pressure compressing said resilient tubular seats, means adapted for shifting the stem plate to different operative positions without lifting the same, and means for closing the pressure port prior to movement of the stem plate from one position to another, whereby to permit turning of the stem plate substantially free of hydraulic pressure thereon.

20. The combination in a rotary plate type valve of a ported body member, a ported stem plate adapted to effect different communication between the ports in the body member in different positions of the plate, a cover member on the body member enclosing the plate, one of said members having a pressure port normally communicating with the inside of the cover member, an operating stem extending through the other of said members and having means for selectively reciprocating or rotating the same, means providing a slidable driving connection between said stem and said plate to permit reciprocatory movement of the stem with respect to the plate while maintaining an operating connection therewith for rotation thereof, and a shut-off valve to close the pressure port movable with said stem toward and away from the pressure port in the reciprocatory movement of said stem preparatory to the turning of the plate with the stem.

21. In a plate type valve, a ported body member, a ported plate member adapted to effect different communication between the ports in the body member in different positions of the plate member, a cover member on the body member enclosing the plate member, valve means for a port in one of said members, means for rotating the plate member to different operative positions, and means operable by said last means independently of any movement of the plate member for moving the valve means to and from closed position.

22. In a plate type valve, a ported body member, a ported stem plate rotatable with respect thereto to different operative positions to effect different communication between the ports in the body member in different positions of the plate, a cover on the body member enclosing the plate and having a pressure port in the central portion thereof, an operating stem reciprocably and rotatively mounted in the central portion of the body member and extending through the plate into said cover, a shut-off valve rotatably mounted on the end of said stem and arranged upon endwise movement of the stem in one direction to close the pressure port, a coiled compression spring acting between the shut-off valve and the plate to hold the latter seated under spring pressure when the pressure port is closed, means providing a sliding driving connection between said stem and said plate, and means for communicating reciprocatory and rotary movement to said stem.

23. In a plate type valve, a ported body member, a ported stem plate rotatable with respect thereto to different operative positions to effect different communication between the ports in the body member in different positions of the plate, a cover on the body member enclosing the plate and having a pressure port therein, an operating stem reciprocably and rotatively mounted in the central portion of the body member and extending through the plate into said cover, one of the ports in the body member being a low pressure drain port, a pressure relief valve on the plate operable in the reciprocatory movement of the stem to open the low pressure drain port into communication with the inside of the cover preparatory to the turning of the plate, means providing a sliding driving connection between said stem and said plate, and means for communicating reciprocatory and rotary movement to said stem.

24. In a plate type valve, a ported body member, a ported plate member adapted to effect different communication between the ports in the body member in different positions of the plate member, a cover member on the body member enclosing the plate member, valve means for a port in one of said members, means for rotating the plate member to different operative positions, said means being adapted to be rotated for rotation of the plate member and also to be reciprocated, and means operable in the reciprocatory movement of said last means independently of any movement of the plate member for moving the valve means to and from closed position.

25. In a plate type valve, the combination of a ported body member, a ported stem plate member adapted to effect different communication between the ports in the body member in different positions of the plate, a cover member on the body member enclosing the plate, one of said members having a pressure port normally communicating with the inside of the cover member, whereby said stem plate is normally held seated under hydraulic pressure, rotary means adapted for turning said plate whereby to shift the plate to different operative positions, said rotary means being also axially reciprocable, and a shut-off valve for interrupting flow of fluid to the inside of the cover member operable by the last mentioned means upon reciprocation thereof independently of any movement of the stem plate.

26. In a plate type valve, comprising a ported body member and a ported stem plate, separate and independent, compressible, resilient, tubular seats communicating with and projecting from the ports of one of said last two members so as to present longitudinally compressible end portions for engagement with and compression against flat seating surfaces provided on the other member to space the stem plate relative to the body member and establish sealed communication with the ports of the body member in different positions of rotation of the stem plate relative to the body member, a cover member on the body member enclosing the plate member, one of said members having a pressure port normally communicating with the inside of the cover member, whereby said stem plate is normally held seated under hydraulic pressure compressing said resilient tubular seats, means adapted for turning the stem plate to different operative positions, means for closing the pressure port, and means for relieving pressure within the cover member, both said last mentioned two means being operated by said turning means prior to turning movement thereof, whereby to permit moving the plate substantially free of hydraulic pressure thereon.

27. In a plate type valve, comprising a ported body member and a ported stem plate, separate and independent, compressible, resilient, tubular seats communicating with and projecting from the ports of one of the last two members so as to present longitudinally compressible end portions for engagement with and compression against flat seating surfaces provided on the other member to space the stem plate relative to the body member and establish sealed communication with the ports of the body member in different positions of rotation of the stem plate relative to the body member, a cover member on the body member enclosing the stem plate, one of said members having a pressure port normally communicating with the inside of the cover member, whereby said stem plate is normally held seated under hydraulic pressure compressing said resilient tubular seats, means adapted for turning the stem plate to different operative positions, and means for closing the pressure port without any movement of the stem plate, whereby to permit turning the stem plate substantially free of hydraulic pressure thereon.

28. In a plate type valve, a ported body member, a ported stem plate rotatable with respect thereto to different operative positions to effect different communication between the ports in the body member in different positions of the plate, a cover on the body member enclosing the plate and having a pressure port in the central portion thereof, an operating stem reciprocably and rotatively mounted in the central portion of the body member and extending through the plate into said cover, a shut-off valve rotatably mounted on the end of said stem and arranged upon endwise movement of the stem in one direction to close the pressure port, means providing a sliding driving connection between said stem and said plate, and means for communicating reciprocatory and rotary movement to said stem.

29. In a plate type valve as set forth in claim 28, wherein one of the ports in the body member is a low pressure drain port, a pressure relief valve on the stem plate operable in the reciprocatory movement of the stem to open the low pressure drain port into communication with the inside of the cover preparatory to the turning of the plate.

CHESTER T. McGILL.
DE WAYNE WESSEL.
MORRIS W. SMITH.